US006484887B1

(12) United States Patent
Fukutomi et al.

(10) Patent No.: US 6,484,887 B1
(45) Date of Patent: Nov. 26, 2002

(54) ION-SELECTIVE MEMBRANES, THEIR PRODUCTION PROCESS, USE OF THE ION-SELECTIVE MEMBRANES, AND APPARATUSES PROVIDED WITH THE ION-SELECTIVE MEMBRANES

(75) Inventors: Takashi Fukutomi, Nangoku (JP); Yoshifumi Sugito, Tokyo (JP); Minoru Takizawa, Tokyo (JP); Naomi Oguma, Tokyo (JP); Seiji Doi, Tokyo (JP); Michiei Nakamura, Tokyo (JP)

(73) Assignee: Dainichiseika Color & Chemicals Mfg. Co., Ltd., Tokyo (JP)

( * ) Notice: Subject to any disclaimer, the term of this patent is extended or adjusted under 35 U.S.C. 154(b) by 0 days.

(21) Appl. No.: 09/506,689

(22) Filed: Feb. 18, 2000

(30) Foreign Application Priority Data

Feb. 22, 1999 (JP) ............................................ 11-043722

(51) Int. Cl.⁷ ...................... B01D 69/10; B01D 69/14; C08J 5/22; C08J 5/20
(52) U.S. Cl. .................... 210/488; 210/321.6; 210/483; 210/489; 210/490; 210/500.27; 210/502.1; 210/503; 210/504; 210/506; 521/27; 521/28
(58) Field of Search .................. 210/321.6, 500.27, 210/502.1, 483, 488, 489, 490, 506, 503, 504; 521/27, 28

(56) References Cited

U.S. PATENT DOCUMENTS

| | | | |
|---|---|---|---|
| 2,965,697 A | | 12/1960 | Duddy |
| 3,376,168 A | | 4/1968 | Horowitz |
| 3,417,459 A | | 12/1968 | Pomerantz et al. |
| 4,116,889 A | | 9/1978 | Chlanda et al. |
| 4,230,463 A | | 10/1980 | Henis et al. |
| 4,258,900 A | | 3/1981 | Kindersley |
| 4,346,142 A | | 8/1982 | Lazear |
| 4,468,441 A | | 8/1984 | D'Agostino et al. |
| RE31,824 E | | 2/1985 | D'Agostino et al. |
| 4,547,411 A | | 10/1985 | Bachot et al. |
| 4,584,246 A | | 4/1986 | Liu et al. |
| 4,613,544 A | | 9/1986 | Burleigh |
| 5,256,503 A | | 10/1993 | Cook et al. |
| 5,304,307 A | * | 4/1994 | Linder et al. |
| 5,543,045 A | | 8/1996 | Fukutomi et al. |
| 5,770,631 A | | 6/1998 | Fukutomi et al. |

FOREIGN PATENT DOCUMENTS

| | | | |
|---|---|---|---|
| EP | 0 160 473 | | 11/1985 |
| EP | 760249 | * | 3/1997 |
| FR | 2 432 535 | | 2/1980 |
| GB | 1039444 | | 8/1966 |
| GB | 1197357 | * | 7/1970 |
| GB | 1 303 897 | | 1/1973 |
| GB | 1 372 225 | | 10/1974 |
| GB | 1 449 814 | | 9/1976 |
| GB | 1 493 654 | | 11/1977 |
| GB | 1 512 553 | | 6/1978 |
| GB | 1 538 810 | | 1/1979 |
| GB | 2 098 628 | | 11/1982 |

OTHER PUBLICATIONS

C.M. Cheng, et al. "Pore Structural Studies of Monodisperse Porous Polymer Particles", Journal of Colloid and Interface Science, vol. 150, No. 2, 1992, pp. 549–558.

Takeji Hashimoto, et al., "Observation of "Mesh "and "Strut" Structures in Block Copolymer/Homopolymer Mixtures", Macromolecules, vol. 25, No. 5, Mar. 2, 1992, pp. 1433–1439.

Guang Hui Ma, et al. "Determination of the Distribution of Interparticle Contact Angle in the Binary Mixture of Microgels", Polymer International, vol. 30, No. 4, 1993, pp. 533–539.

* cited by examiner

Primary Examiner—John Kim
(74) Attorney, Agent, or Firm—Oblon, Spivak, McClelland, Maier & Neustadt, P.C.

(57) ABSTRACT

An ion-selective membrane is formed integrally of an ion-selective membrane forming component and a woven-fabric-shaped backing. The ion-selective membrane forming component comprises a cationic polymer component and/or an anionic polymer component and a matrix component. Each of the ionic polymer components is a particulate polymer having an average particle size in a range of from 0.01 to 10 µm. The woven-fabric-shaped backing has a meshed structure. The ion-selective membrane can be produced by forming it while maintaining a layer of a coating formulation, in which the ionic polymer component is dispersed in a solution or dispersion of the matrix component in an organic solvent, in close contact with the woven-fabric-shaped backing. The ion-selective membrane is useful for the permeation of an electrolyte. An apparatus provided with the ion-selective membrane is also provided.

8 Claims, 2 Drawing Sheets

ION-SELECTIVE MEMBRANES, THEIR PRODUCTION PROCESS, USE OF THE ION-SELECTIVE MEMBRANES, AND APPARATUSES PROVIDED WITH THE ION-SELECTIVE MEMBRANES

BACKGROUND OF THE INVENTION a) Field of the Invention

This invention relates to ion-selective membranes reinforced with woven-fabric-shaped backings capable of permeating electrolytes therethrough, a process for their production, use of the ion-selective membranes, and apparatuses provided with the ion-selective membranes.

b) Description of the Related Art

Cation-selective or anion-selective membranes and charge mosaic membranes are known to date. A cation-selective or anion-selective membrane, which may hereinafter also be called a "sole ion-selective membrane", has cationic or anionic polymer components. In a charge mosaic membrane, on the other hand, a cationic polymer component and an anionic polymer component extend in substantially electrically (ionically) continuous forms in the direction of the thickness of the membrane. A sole ion-selective membrane has function that counter ions can be either adsorbed or permeated but non-counter ions are repelled, while a charge mosaic membrane has function that electrolytes of low molecular weights can be permeated but non-electrolytes are not permeated or are permeated at very low permeation rates.

For the production of the above-described sole ion-selective membranes or charge mosaic membranes, the following processes have been proposed: (1) concerning sole ion-selective membranes, (i) fine powder of an ion exchange resin and a matrix-forming thermoplastic resin, such as polyethylene or polyvinyl chloride, are kneaded into a homogeneous mass, and the homogeneous mass is then formed under heat, (ii) triethylamine, chlorosulfonic acid or the like is reacted directly to a film of polyethylene, polyvinyl chloride or the like such that ionic: groups are introduced onto the film, and (iii) (meth)acrylic acid is graft-polymerized on a polyethylene, polypropylene or like film or a membrane obtained by graft polymerization of styrene or vinylpyridine is sulfonated or quaternized, such that ionic groups are introduced; and (2) for charge mosaic membranes, block copolymers are used.

The process (1)(i), which makes use of an ion exchange resin the particle size of which is coarse, is easy to practice, but has difficulty in making the concentration of immobilizable ions higher because the resin particles has a small specific surface area. The process (1)(ii), in which ionic groups are introduced onto a membrane by treatment through a chemical reaction, is cumbersome to practice. On the other hand, the process (2) making use of a block copolymer is by itself very difficult to practice. In contrast, the process in which a cationic component and/or an anionic component is used in the form of fine polymer particles has a merit in that the production of a sole ion-selective membrane or charge mosaic membrane is very easy.

In the above-described process making use of fine polymer particles, use of the fine polymer particles in the form of microspheres makes it possible to rather easily; produce an ion-selective membrane owing to the inherent close packability and isotropy of the microspheres. Nonetheless, this process is accompanied by a problem for the production of a membrane of large area, because the components of the membrane are ionic polymers and the membrane so formed tends to shrink or lose strength upon drying.

As a process which reduces the above problem, a process making use of a pliable polymer component as a matrix component for a charge mosaic membrane is proposed in JP Kokai No. 10-87855. This process has facilitated the production of a charge mosaic membrane of large area. However, this process requires long time for the formation of the membrane and moreover, has difficulty in producing a thin membrane having a uniform thickness. As processes capable of lessening this problem, it is proposed in Japanese Patent Applications Nos. 10-232732 and 10-237708 to form a membrane from a composition in which ionic polymer components are dispersed in a solution of a resin as a matrix component, such as a polysulfone resin, a polyarylate resin or a polyurethane resin, in an organic solvent; and to use a backing such as a woven fabric or a nonwoven fabric in combination. These processes have made it possible to shorten the membrane-forming time and to obtain an ion-selective membrane having a uniform and thin thickness and permitting easy handling.

However, formation of an ion-selective membrane, which has been produced by using a backing such as a woven fabric or non-woven fabric in combination, into a shape suited for incorporation in an actual apparatus—such as a planar membrane, a spiral membrane, a corrugated membrane, a cylindrical membrane or hollow capillaries—involves problems in that the permeation performance for electrolytes is reduced because of pin-holes or crazing formed in the membrane due to variations or nonuniformity of openings in the backing or because of nonuniformity in thickness of membranes formed around the openings in the backing. There is hence an outstanding desire for the resolution of this problem.

SUMMARY OF THE INVENTION

An object of the present invention is therefore to provide an ion-selective membrane, which makes use of ionic polymer component or components and a matrix component, is resistant to the development of pinholes or crazing upon formation or handling of the membrane, and is uniform in thickness around openings of a backing, and has sufficient strength. Another object of the present invention is to provide a process for the production of the ion-selective membrane.

To achieve the above-described objects, the present invention provides, in one aspect thereof, an ion-selective membrane formed integrally of an ion-selective membrane forming component, which comprises a cationic polymer component and/or an anionic polymer component and a matrix component, and a woven-fabric-shaped backing, wherein each ionic polymer component is a particulate polymer having an average particle size in a range of from 0.0 to 10 $\mu$m, and said woven-fabric-shaped backing has a meshed structure; in another aspect thereof, a process for the production of the ion-selective membrane; in a further aspect thereof, use of the ion-selective membrane; and in a still further aspect thereof, an apparatus provided with the ion-selective membrane.

The ion-selective membrane according to the present invention is resistant to the development of pin-holes or crazing upon formation or handling, is uniform in thickness around openings of a backing, and retains sufficient mechanical strength.

Therefore, the ion-selective membrane according to the present invention can be used for the selective permeation of an electrolyte, for example, for the transport, separation, concentration, adsorption or the like of an electrolyte.

DETAILED DESCRIPTION OF THE INVENTION AND PREFERRED EMBODIMENTS

Figure 1:
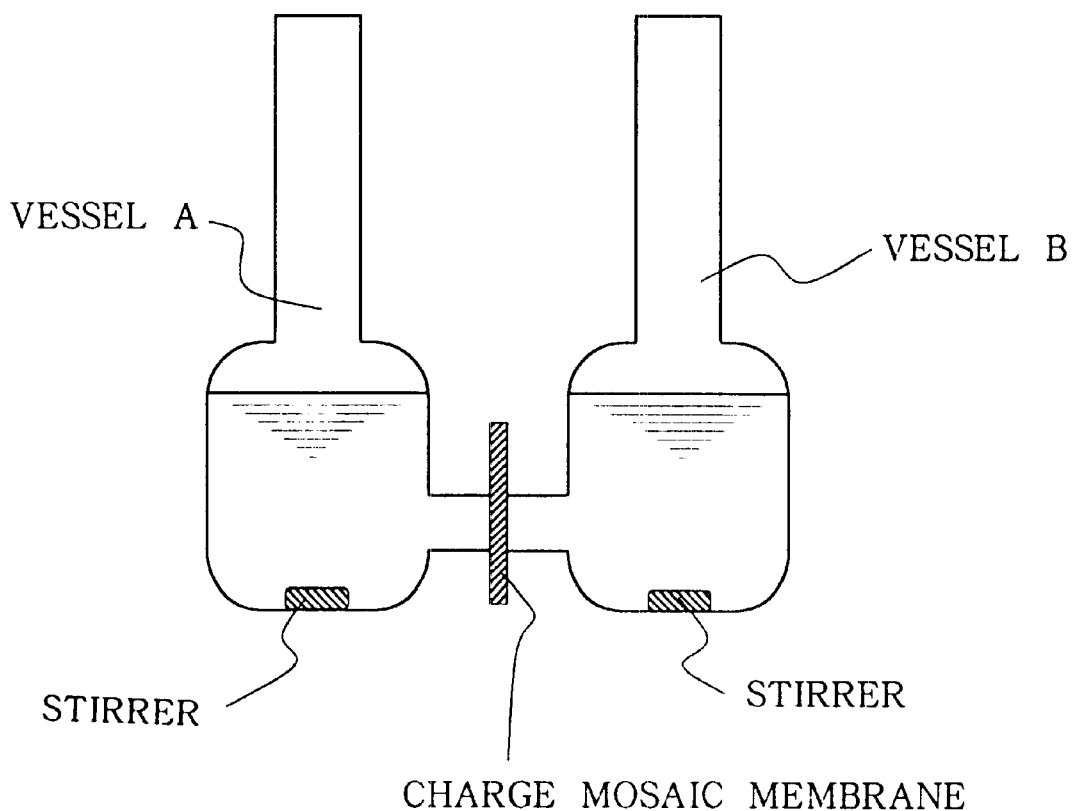
FIG. 1 is a schematic vertical cross-sectional view of an apparatus used for the evaluation of charge mosaic membranes and an ion-selective membrane obtained in Examples 3–5.

The ion-selective membrane according to the present invention is characterized in that it is integrally formed of the ion-selective membrane forming component—which comprises the cationic polymer component and/or the anionic polymer component, as particulate polymer or polymers, and the matrix component—and the woven-fabric-shaped backing having the meshed structure. Accordingly, the production process of the ion-selective membrane is characterized in that the membrane is formed while maintaining a layer of a coating formulation, in which the ionic polymer component or components are dispersed in a solution or dispersion of the matrix component in an organic solvent, in close contact with the woven-fabric-shaped backing. Incidentally, each ionic polymer component employed in the present invention is a particulate polymer having an average particle size in a range of from 0.01 to 10 µm, preferably in a range of from 0.02 to 1 µm.

Examples of ionic polymer components usable in the present invention can include, as cationic polymer components, polymers containing cationic groups such as primary to tertiary amino groups, quaternary ammonium groups or pyridinium groups or groups of salts thereof and as anionic polymer components, polymers containing anionic groups such as sulfonic groups, carboxylic groups, sulfate ester groups or phosphate ester groups or groups of salts thereof. Upon converting ionic groups into groups of salts thereof, an acid, for example, hydrochloric acid, sulfuric acid, phosphoric acid or an organic acid can be used for cationic groups, while an alkali or a base, for example, an alkali metal, ammonia, an amine or an alkanolamine can be used for anionic groups.

The above-described ionic polymer components may each be prepared by forming a nonionic particulate polymer and then subjecting the it to chemical modification such as amination, quaternary ammoniation, hydrolysis, sulfonation or sulfation. Chemical modifications other than the above-exemplified ones can also be employed for the preparation of the ionic polymer component or components provided that they make it possible to cationize or anionize such nonionic polymers.

Typical examples of monomers usable for the preparation of the ionic polymer components, each of which contains ionic groups or groups of their salts, can include anionic monomers such as (meth)acrylic acid, maleic acid, fumaric acid, itaconic acid, crotonic acid, styrenesulfonic acid, (meth)acryloyloxypropylsulfonic acid, 2-sulfoethyl (meth) acrylate, 2-(meth)acryloylamino-2-methyl-1-propanesulfonic acid, 2-(meth)acryloylamino-2-propanesulfonic acid and vinyl-sulfonic acid, and salts thereof; 4-vinylpyridine and 2-vinylpyridine, and quaternized derivatives thereof; and cationic monomers such as dimethylaminoethyl (meth)acryl, diethylaminoethyl (meth) acrylate, 4-vinylbenzyldimethylamine and 2-hydroxy-3-(meth)acryloxypropyldimethylamine, and salts thereof.

Ionic polymers can be obtained by polymerizing these anionic or cationic monomers. Upon polymerization, known nonionic monomers can be copolymerized with such ionic monomers as needed. Illustrative of the nonionic monomers are lauryl (meth)acrylate and stearyl (meth)acrylate. The nonionic monomer can be used in a proportion of 0 to 80 wt. % based on the whole monomers.

On the other hand, representative examples of monomers usable for the production of nonionic polymers, which are to be converted into ionic polymers by chemical modifications, can include chemically modifiable monomers, for example, styrene compounds such as styrene, α-methylstyrene, chloromethylstyrene and hydroxymethylstyrene; (meth)acrylate ester compounds such as methyl (meth)acrylate, ethyl (meth)acrylate, hydroxyethyl (meth)acrylate, polyethylene glycol (meth)acrylate, hydroxypropyl (meth)acrylate and polypropylene glycol (meth)acrylate; (meth)acrylamide compounds such as (meth)acrylamide, N-methyl(meth) acrylamide, N-methylol(meth)acrylamide, N-butoxy-methyl (meth)acrylamide and N,N-dimethylacrylamide; acrylonitrile; and vinyl acetate. Upon polymerizing the above-described monomer, a known nonionic monomer which remains substantially unchanged by such a chemically-modifying reaction can be copolymerized. Illustrative of such a monomer are lauryl (meth)acrylate and stearyl (meth) acrylate.

Each ionic or nonionic particulate polymer which is produced using the corresponding one of the above-described monomers or the like may preferably be in a crosslinked form because an organic solvent is used upon forming it into a membrane, although it is not absolutely required to be crosslinked. Crosslinking of each particulate polymer is generally achieved by copolymerizing the above-described monomer together with a crosslinking monomer upon polymerization of the polymer or the like. Illustrative of the crosslinking monomer are bifunctional monomers such as divinyl-benzene, methylene bis(meth)acrylamide, ethylene glycol dimethacrylate and 1,3-butylene glycol dimethacrylate; trifunctional monomers such as trimethylolpropane trimethacrylate; and tetrafunctional (meth) acrylates.

These crosslinking monomers can be used preferably in a range of from 0.1 to 30 parts by weight, more preferably in a range of from 0.5 to 10 parts by weight per 100 parts by weight of the monomer making up the polymer.

As a representative process for the production of the particulate polymer from such monomer and crosslinking monomer as described above, radical polymerization in an aqueous system or non-aqueous system can be mentioned. Illustrative methods of the polymerization can include, but are not limited to, polymerization methods such as emulsion polymerization, soap-free polymerization, suspension polymerization, dispersion polymerization, and reversed-phase emulsion polymerization.

As a polymerization initiator, conventionally-known polymerization initiators useful in radical polymerization are all usable. Illustrative are azo compounds such as 2,2'-azoisobutyronitrile, 2,2'-azobis(methylisobutyrate), 2,2'-azobis(2,4-dimethylvaleronitrile), 1,1'-azobis (cyclohexane-1-carbonitrile), 2,2'-azobis(2-amidinopropane)dihydrochloride, 2,2'-azobis(2-amidinopropane)diacetate and 2,2'-azobis(N,N'-dimethyleneisobutylamidine)dihydrochloride; organic peroxides such as cumene hydroperoxide, dicumyl peroxide, benzoyl peroxide and lauryl peroxide; and persulfates such as ammonium persulfate and potassium persulfate.

As the matrix component of the ion-selective membrane in the present invention, a matrix component which is most preferable for the objects of the present invention is a polymer which has property to permit formation of a membrane by drying under heat or the like upon formation of the ion-selective membrane, is excellent in physical properties such a chemical resistance, solvent resistance and waterproofness, is also stable chemically, and has superb durability against hydrolysis and oxidative degradation. Specific examples of the matrix component can include polymers such as polysulfone resins of the below-described formulas (1)–(3), polyarylate resins of the below-described formulas (4)–(6), polyamide resins of the below-described formula (7), polyamide-imide resin of the below-described formulas (8) and (9), polyimide resins of the below-described formulas (10) and (11), polyurethane resins of the below-described formulas (12) and (13), fluorinated resins of the below-described formulas (14)–(16), silicone resins of the below-described formula (17), and hydrogenation products of homopolymer or copolymer resins of diene monomers, said hydrogenation products having the below-described formula (18). The above polymers can be used either; singly or in combination. To impart pliability to the resulting ion-selective membrane, a diene polymer such as a butadiene-styrene copolymer or a polyolefin polymer such as polyethylene, polyethylene ionomer, polypropylene, a polyolefin terpolymer or an ethylene-vinyl acetate copolymer may also be added to the above-described polymer.

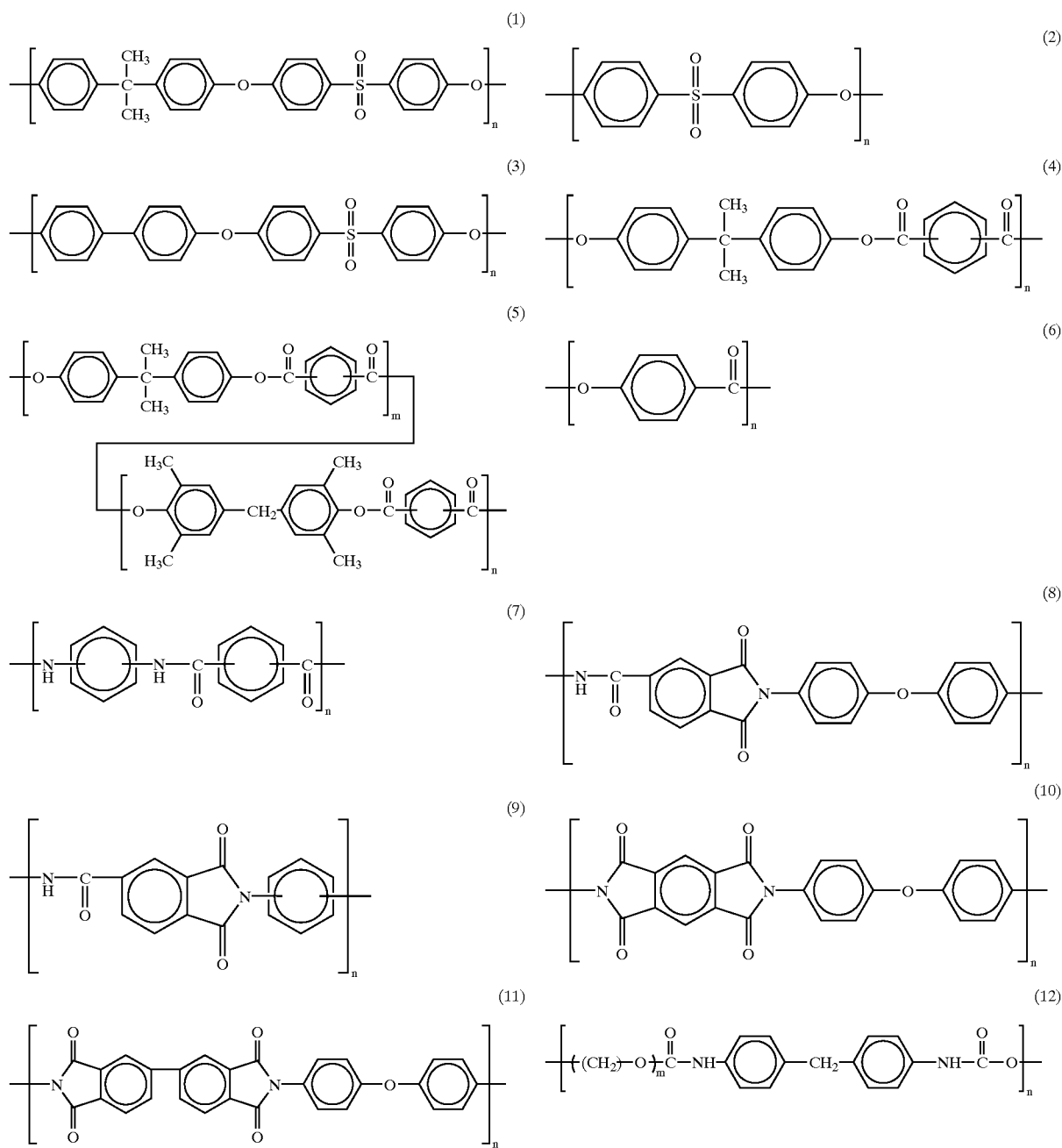

-continued

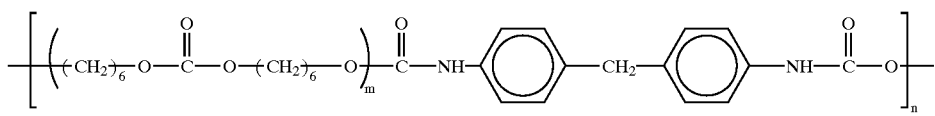
(13)

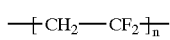
(14)

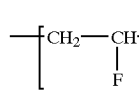
(15)

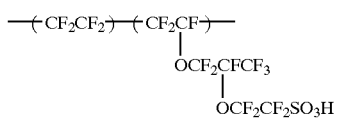
(16)

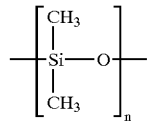
(17)

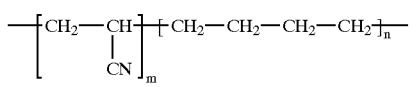

(18)

In the above-described formulas, n and m stand for numerical values large enough to provide their corresponding resins with molecular weights of from about 1,000 to 500,000.

Examples of the material of the woven-fabric-shaped backing of the ion-selective membrane in the present invention can include stainless steel, aluminum, ceramics, polyesters, nylon, polyamides, polycarbonates, polypropylene, polyethylene, cellulose, chitin, polytetrafluoroethylene, polyurethanes, polysulfones, polyfluorinated vinylidene, aramids, and carbon fibers. In woven-fabric-shaped backings formed of these fibers, openings of their meshed structures are generally in a range of from 1 to 5,000 µm, preferably in a range of from 10 to 1,000 µm. If openings are smaller than 1 µm, crazing tends to occur when the ion-selective membrane forming component (the ionic polymer component or components and the matrix component) is brought into close contact with the woven-fabric-shaped backing or when the ion-selective membrane is cut into a predetermined shape or is mounted on an apparatus. Further, the membrane is formed with varied thicknesses around the openings of the backing, thereby tending to affect the permeation performance for electrolytes. If openings exceed 5,000 µm, on the other hand, the resulting ion-selective membrane tends to develop pinholes or crazing during its formation or use.

The process of the present invention for the production of the ion-selective membrane is characterized in that the membrane is formed while maintaining the layer of the coating formulation in close contact with the woven-fabric-shaped backing having the meshed structure. The coating formulation has been prepared by dispersing the particulate polymer or polymers, i.e., the ionic (cationic and/or anionic) polymer component or components in a solution or dispersion of at least one polymer as the matrix component in an organic solvent. This at least one polymer is selected from the group consisting of polysulfone resins, polyarylate resins,: polyamide resins, polyimide resins, polyamideimide resins, polyurethane resins, fluorinated resins, silicone resins, and hydrogenation products of homopolymer or copolymer resins of diene monomers.

Firstly, a coating formulation is prepared by mixing or dispersing the ionic polymer component or components in the solution or dispersion of the matrix component in the organic solvent. Upon mixing dispersing the ionic polymer component or components, they are used as are, namely, as fine powder, or they are used in forms dispersed beforehand in the organic solvent. Although no particular limitation is imposed on a method for mixing or dispersing the ionic polymer component or components in the solution or dispersion of the matrix component in the organic solvent, the mixing or dispersion can be conducted, for example, by ultrasonic agitation, in a dissolver or homomixer, or by a stirrer. Concerning the proportions of the ionic polymer component or components and the matrix component in the ion-selective membrane, the matrix component may amount preferably to 2 to 95 wt. %, more preferably to 10 to 80 wt. % based on a sum of both of the components.

The solvent employed in the present invention is an organic solvent which can dissolve or finely disperse the matrix component. Illustrative are nitrogen-containing solvents such as N-methyl-2-pyrrolidone, N-ethyl-2-pyrrolidone, N-vinyl-2-pyrrolidone, N,N-dimethylformamide, N,N-diethylformamide, N,N-dimethylacetamide, and N,N-diethylacetamide; ether solvents such as dioxane and tetrahydrofuran; ketone solvents such as methyl ethyl ketone and methyl isobutyl ketone; dimethylsulfoxide; propylene glycol monomethyl ether; isopropyl alcohol; propylene glycol monomethyl ether acetate; xylene; dichloroethylene; chloroform; and cyclohexane. Among these organic solvents, nitrogen-containing solvents excellent in the dispersibility and dispersion stability of the ionic polymer component or components are preferred, because upon mixing the ionic polymer component or components and the matrix component, the ionic polymer component or components are used either as fine particles or in forms dispersed in the organic solvent. Other organic solvents or water-base. solvents may also be used in combination insofar as the resulting dispersion system is not rendered unstable.

The ion-selective membrane is next formed using the coating formulation obtained as described above. The ion-selective membrane can be formed by coating or casting the coating formulation on a suitable release base material in accordance with a known coating method, bringing the woven-fabric-shaped backing into close contact with the coated surface and then drying and removing the solvent or by coating or casting the coating formulation on the woven-fabric-shaped backing or impregnating the woven-fabric-shaped backing with the coating formulation and then drying the coating formulation to drive off the solvent. Subsequent to the drying, the resultant membrane may be subjected to treatment such as heat fusing treatment, heat pressing treatment or quaternization as needed, whereby an ion-selective membrane according to the present invention in which the ion-selective membrane forming component and the woven-fabric-shaped backing are integrated is obtained.

Examples of the release base material employed in the present invention can include glass plates; aluminum sheets and plates; sheets, films or formed plates of plastics such as polytetrafluoroethylene, polypropylene and polyethylene; and mold release paper coated with silicone resin or polypropylene resin. Illustrative methods for coating the base material or woven-fabric-shaped backing with the coating formulation can include conventionally-known coating methods such as roll coating, blade coating, knife coating, squeegee coating, air doctor coating, gravure coating, rod coating, spray coating, and impregnation. The preform, which has been obtained by coating the base material and bringing the woven-fabric-shaped backing into close contact with the coated surface as described above, is dried, for example, in a drum drier or a forced air drier or under infrared ray lumps. The resulting ion-selective membrane of the present invention has a thickness generally in a range of from 1 to 5,000 $\mu$m, more preferably in a range of from 10 to 2,000 $\mu$m, although the thickness varies depending on the thickness of the woven-fabric-shaped backing.

The ion-selective membrane of the present invention obtained as described above has an integrated structure with the ion-selective membrane forming component (the ionic polymer component or component and the matrix component) penetrated in the woven-fabric-shaped backing. When the woven-fabric-shaped backing is brought into close contact with a surface of the base material, said surface having been coated with the dispersion of the ion-selective membrane forming component, and the membrane of the ion-selective membrane forming component is transferred onto the backing, the ion-selective membrane forming component and the backing are also integrated together at least in their interface. To increase an effective membrane area, to improve the permeation efficiency for electrolytes and to improve pressure resistance, the ion-selective membrane according to the present invention can be used by forming it into a planar membrane, a spiral membrane, a corrugated membrane, a cylindrical membrane or hollow capillaries.

When the ion-selective membrane according to the present invention is a sole ion-selective membrane, the membrane contains a cationic polymer component or an anionic polymer component as an ionic polymer component, and has function that counter ions can be adsorbed or permeated but non-counter ions are repelled. When the ion-selective membrane is a charge mosaic membrane, a cationic polymer component and an anionic polymer component extend in substantially electrically continuous forms in the direction of the thickness of the membrane, and the membrane has function that electrolytes of low molecular weights can be permeated but non-electrolytes cannot be permeated or can be permeated at very low permeation rates.

Sole ion-selective membranes according to the present invention are therefore useful as ion-exchange membranes for electrodialysis, diffusion dialysis, electrolytic dialysis, batteries and the like; as chelating materials for metal ions; and for the elimination or purification of acids, amines or the like byproduced in electrodeposition paints. In particular, the sole ion-selective membranes according to the present invention are useful as ion-exchange membranes in the production of common salt by seawater concentration, desalting of brine, separation and purification of ionic components in drug and food industry, and separation of acids, recovery of spent acids and electrolytic oxidation or reduction in metal refining or surface treatment steps. They are also useful as adsorptive separators for eliminating toxic metal ions from waste water or collecting valuable metals from seawater.

On the other hand, charge mosaic membranes according to the present invention can be used for the selective permeation of electrolytes. As specific application examples, they are useful for the desalting of electrolytes of low molecular weights such as sodium chloride, potassium chloride, sodium sulfate, sodium phosphate and calcium chloride and also for the deionization of hydrochloric acid, acetic acid and sodium hydroxide. Specifically, the charge mosaic membranes according to the present invention are useful for desalting in water treatment for the production of drink water, industrial water, purified water, ultra-pure water and the like; desalting of industrial effluents from chemical industry and metal industry; desalting of dyes and pigments in color production industry; desalting of biochemistry-related products in fermentation industry and food industry; desalting of pharmaceutical products; and adsorption of dyes as recording media.

In particular, the charge mosaic membranes out of the ion-selective membranes according to the present invention are useful in fields where electrodialysis has heretofore been unapplicable for denaturation of target substances due to evolution of heat, membrane contamination due to ionic adsorption, or a like reason, for example, for the desalting of proteins, DNAs and the like and the desalting of dyes, pigments, surfactants and the like. Owing to the membrane structure described above, the charge mosaic membranes according to the present invention are also useful as diaphragms or the like in electrodialysis, diffuse dialysis, electrolysis, a cell reaction or the like which makes use of a membrane property such as electrical conductivity or ion permeability.

The present invention will next be described more specifically by synthesis examples and examples, in which the designations of "part" or "parts" and "%" are by weight basis unless otherwise specifically indicated.

Synthesis Example 1

Polymer A: Cationic Particulate Polymer

| | |
|---|---|
| 4-Vinylpyridine | 20.0 parts |
| Divinylbenzene | 2.0 parts |
| 2,2'-Azobis(2-amidinopropane) dihydrochloride | 0.4 part |
| Water | 1,000 parts |

The above components were charged in a flask and under a nitrogen gas stream, were polymerized at 80° C. for 8 hours. The resulting polymerization product was lyophilized, whereby a particulate polymer was obtained with its inside crosslinked. As a result of a measurement under a scanning electron microscope, the average particle size of the particulate polymer was found to be about 350 nm.

Synthesis Example 2

Polymer B: Cationic Particulate Polymer

| | |
|---|---:|
| Chloromethylstyrene | 200.0 parts |
| Divinylbenzene | 10.0 parts |
| Potassium persulfate | 4.0 parts |
| Sodium thiosulfate | 4.0 parts |
| Sodium lauryl sulfate | 40.0 parts |
| Water | 1,000 parts |

The above components were charged in a flask and under a nitrogen gas stream, were polymerized at 50° C. for 12 hours. The resulting particulate polymer was collected, and was then thoroughly washed with warm water and methyl alcohol to remove the surfactants from the surfaces of the particulate polymer. The particulate polymer was dispersed in methyl ethyl ketone, so that a dispersion was prepared. Triethylamine was added to the dispersion, and the resulting mixture was stirred at 70° C. for 12 hours to convert the particulate polymer into the quaternary ammonium salt. The average particle size of the particulate polymer was about 150 nm.

Synthesis Example 3

Polymer C: Anionic Particulate Polymer

| | |
|---|---:|
| Styrene | 41.6 parts |
| Acrylonitrile | 7.1 parts |
| Hydroxyethyl methacrylate | 8.1 parts |
| Divinylbenzene | 8.7 parts |
| Potassium persulfate | 0.5 part |
| Water | 1,000 parts |

The above components were charged in a flask and under a nitrogen gas stream, were polymerized at 80° C. for 8 hours. The average particle size of the resulting polymer was about 180 nm. The particulate polymer was collected by filtration, dried and then ground. Subsequently, the particulate polymer (100 parts) so ground were added little by little into 98% concentrated sulfuric acid (650 parts), followed by stirring at 50° C. for 24 hours and then at 80° C. for 3 hours. The reaction mixture was allowed to cool down and was then poured into a large quantity of ice water. Subsequent to neutralization with sodium carbonate, the thus-treated particulate polymer was collected by filtration and then thoroughly washed with water. As a result of an analysis by infrared absorption spectroscopy, ion chromatography and the like, the thus-obtained particulate polymer was confirmed to contain sulfonic groups introduced at a rate of about 1 group per aromatic ring. The average particle size of the particulate polymer was about 240 nm.

Synthesis Example 4

Polymer D: Anionic Particulate Polymer

| | |
|---|---:|
| Sodium styrenesulfonate | 25.0 parts |
| Styrene | 10.0 parts |
| Butyl acrylate | 5.0 parts |
| Acrylamide | 2.8 parts |
| Divinylbenzene | 1.8 parts |
| 2,2'-Azobis(2-amidinopropane) dihydrochloride | 1.0 part |
| Water | 1,000 parts |

The above components were charged in a flask and under a nitrogen gas stream, were polymerized at 75° C. for 10 hours. The particulate polymer so obtained was purified by reprecipitation from acetone-water. The average particle size of the resulting particulate polymer was about 100 nm.

EXAMPLE 1

Polymer A (8.6 parts) was dispersed in N-methyl-2-pyrrolidone (20.0 parts). The dispersion and a 20% solution (71.4 parts) of a polysulfone resin [chemical formula (1)] in N-methyl-2-pyrrolidone were stirred for 1 hour. The resulting dispersion was subjected to defoaming treatment by a vacuum pump, whereby a coating formulation was prepared. The coating formulation was coated by a knife coater on a sheet of mold release paper coated with polypropylene resin (hereinafter simply called "release paper"). A woven polyester fabric (opening: 20 $\mu$m, rate of openings: 50%, thickness: 100 $\mu$m) was brought into close contact with the coated surface, and the resulting preform was then dried with hot air. The thus-dried preform was left over at room temperature for 12 hours in a methyl iodide atmosphere, subjected to salt interchange with dilute hydrochloric acid, washed thoroughly and then dried in air, whereby an ion-selective membrane according to the present invention was obtained. The ion-selective membrane formed as described above had a thickness of about 110 $\mu$m, was free of pinholes or crazing, and showed good durability and handling upon use.

EXAMPLE 2

Polymer C (11.0 parts) was dispersed in N-methyl-2-pyrrolidone (25.0 parts). The dispersion and a 20% solution (64.0 parts) of the polysulfone resin [chemical formula (1)] in N-methyl-2-pyrrolidone solution were stirred for 1 hour. The resulting dispersion was subjected to defoaming treatment, whereby a coating formulation was prepared. The coating formulation was coated by a knife coater on release paper. A woven polyester fabric (opening: 20 $\mu$m, rate of openings: 50%, thickness: 100 $\mu$m) was brought into close contact with the coated surface, and the resulting preform was then dried with hot air. The ion-selective membrane formed as described above had a thickness of about 110 $\mu$m, was free of pinholes or crazing, and showed good durability and handling upon use.

The cation-selective and anion-selective membranes obtained in Examples 1 and 2 were used as ion-exchange membranes of electrodialysis and were applied for the concentration of an aqueous solution of sodium chloride. They were confirmed to have good dialytic performance.

EXAMPLE 3

Polymer A (2.0 parts) was dispersed in N-methyl-2-pyrrolidone (8.0 parts). The dispersion and a 10% solution (66.7 parts) of a polyarylate [chemical formula (4)] in N-methyl-2-pyrrolidone were stirred for 1 hour. The resulting dispersion was mixed with another dispersion consisting of Polymer C (4.7 parts) and N-methyl-2-pyrrolidone (18.7 parts). The dispersion so obtained was subjected to defoaming treatment, whereby a coating formulation was prepared. The coating formulation was coated by a knife coater on release paper. A woven nylon fabric (opening: 500 $\mu$m, rate of openings: 50%, thickness: 200 $\mu$m) was brought into close contact with the coated surface, and the resultant preform was then dried with hot air. The thus-obtained membrane was left over at room temperature for 12 hours in a methyl iodide atmosphere, washed with water and then dried in air, whereby a charge mosaic membrane according to the present invention was obtained. The charge mosaic membrane formed as described above had a thickness of about 210 µm, and the thickness was uniform.

(Evaluation of Membrane)

Figure 2:
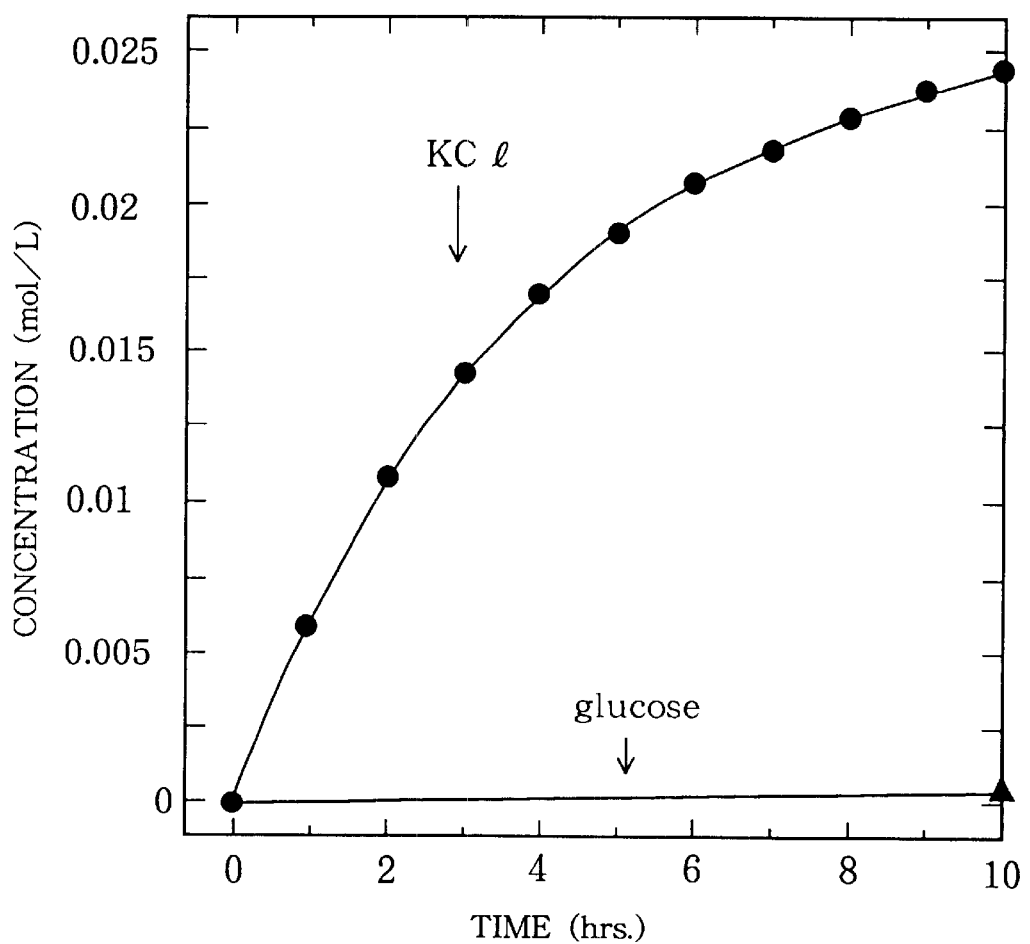
FIG. 2 is a graph showing dialytic separation performance of the charge mosaic membrane of Example 3.

Placed in a container A shown in FIG. 1 were a 0.1 mol/l aqueous solution (100 ml) of potassium chloride as an electrolyte and a 0.1 mol/l aqueous solution (100 ml) of glucose as a nonelectrolyte. On the other hand, deionized water (200 ml) was placed in a container B in the same drawing. While stirring the contents of the containers A,B by stirrers 1,1, respectively, dialysis was then conducted through the above charge mosaic membrane 2 at 25° C. under environmental pressure. As is shown in FIG. 2, sufficient dialytic separation performance was demonstrated.

EXAMPLE 4

Polymer B (4.6 parts) was dispersed in N,N-dimethylformamide (25.8 parts). The dispersion and a 29% solution (37.6 parts) of a polyether polyurethane resin in N,N-dimethylformamide were stirred for 1 hour. The resulting dispersion was mixed with another dispersion consisting of Polymer D (6.4 parts) and N,N-dimethylformamide (25.5 parts), whereby a coating formulation was prepared. The coating formulation was coated by a knife coater on release paper. Further, a nonwoven polyester fabric was brought into close contact with the coated surface, and the resulting preform was dried with hot air, whereby a charge mosaic membrane according to the present invention was obtained. The dialytic separation performance of an electrolyte by the charge mosaic membrane obtained as described above was evaluated in a similar manner as in Example 3. The results were substantially comparable with the dialytic separation performance achieved in Example 3, and the durability and handling were good during its use.

EXAMPLE 5

Polymer A (3.0 parts) was dispersed in N-dimethylformamide (12.0 parts). The dispersion and a 20 wt. % solution (50 parts) of a hydrogenation product [chemical formula (18)] of an acrylonitrile-butadiene copolymerization resin in N,N-dimethylformamide were stirred for 1 hour. The resulting dispersion was mixed with another dispersion consisting of Polymer C (7.0 parts) and N,N-dimethylformamide (28.0 parts), whereby a coating formulation was prepared. The coating formulation was coated by a knife coater on release paper. A non-woven polypropylene fabric (opening: 300 µm, rate of openings: 50%, thickness: 200 µm) was brought into close contact with the coated surface, and the resulting preform was dried with hot air, whereby an ion-selective membrane according to the present invention was obtained. The dialytic separation performance of an electrolyte by the charge mosaic membrane obtained as described above was evaluated in a similar manner as in Example 3. The results were substantially comparable with the dialytic separation performance achieved in Example 3, and further, the durability and handling were good during its use.

What is claimed is:

1. An ion-selective membrane comprising at least one ionic polymer component selected from the group consisting of a cationic polymer component and an anionic polymer component;

a matrix component; and a woven-fabric-shaped backing in the matrix component, wherein each of the at least one ionic polymer component comprises particles evenly dispersed in the matrix component, where the particles have an average particle size in a range of from 0.01 to 10 µm;

the woven-fabric-shaped backing has a meshed structure;

the cationic polymer component is prepared from monomers of chloromethylstyrene and divinylbenzene;

the anionic polymer component is prepared from monomers of styrene, acrylonitrile, hydroxyethylmethacrylate and divinylbenzene;

the matrix component comprises at least one polymer selected from the group consisting of polysulfone resins, polyarylate resins, polyamide resins, polyimide resins, polyamide-imide resins, polyurethane resins, fluorinated resins, silicone resins, and hydrogenation products of homopolymer or copolymer resins of diene monomers; and the ion-selective membrane is produced by a process comprising contacting with the woven-fabric-shaped backing a coating formulation consisting of a mixture or dispersion of the particles of the at least one ionic polymer component, the matrix component and a solvent.

2. An ion-selective membrane according to claim 1, wherein each of said particles has been crosslinked inside.

3. An ion-selective membrane according to claim 1, wherein said ionic polymer component and/or components and said matrix component are used in such proportions that said matrix component amounts to 2 to 95 wt. % based on a sum of both of said components.

4. An ion-selective membrane according to claim 1, wherein said woven-fabric-shaped backing has an opening (a spacing between threads) in a range of from 1 to 5,000 µm.

5. An apparatus provided with an ion-selective membrane as defined in claim 1.

6. An apparatus according to claim 5, wherein said ion-selective membrane as defined in claim 1 is in a form of a planar membrane, a spiral membrane, a corrugated membrane, a cylindrical membrane or hollow capillaries.

7. An ion-selective membrane according to claim 1, wherein the woven-fabric-shaped backing has a meshed structure with openings in a range of from 10 to 1000 µm.

8. An ion-selective membrane according to claim 1, wherein the matrix component comprises a member selected from the group consisting of the following polymers of formulas (1) to (18):

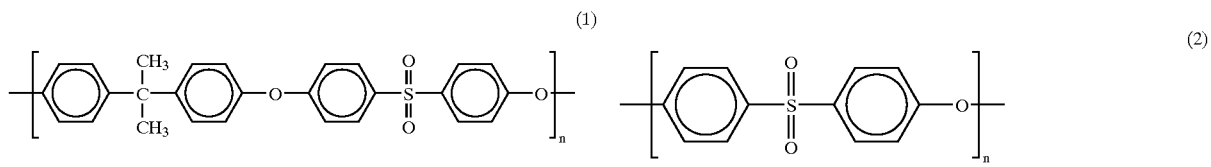

-continued
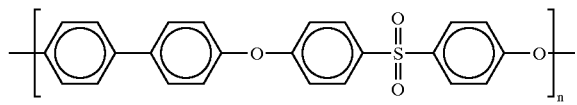 (3)
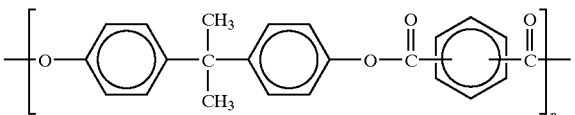 (4)
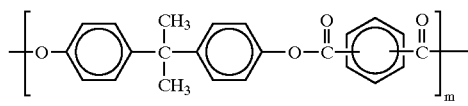 (5)
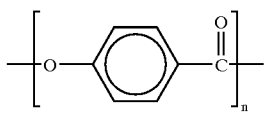 (6)
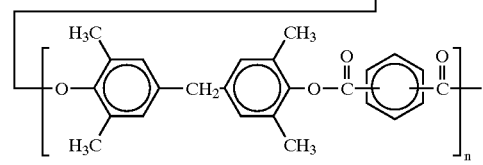
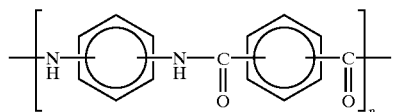 (7)
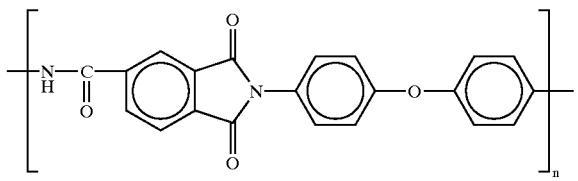 (8)
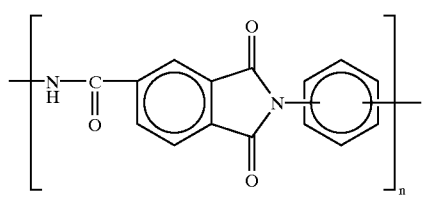 (9)
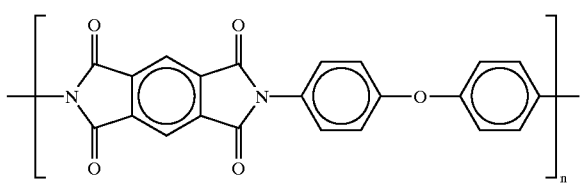 (10)
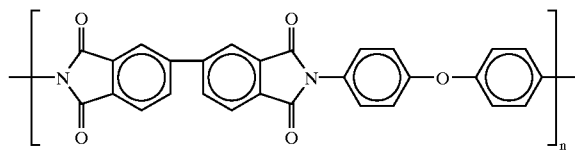 (11)
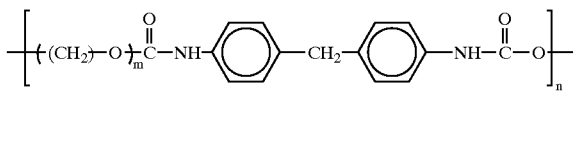 (12)
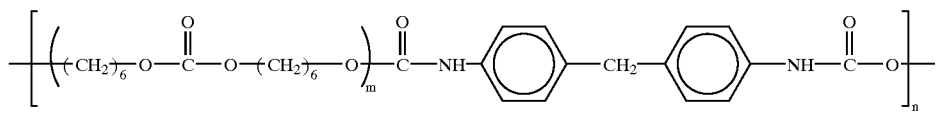 (13)
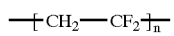 (14)
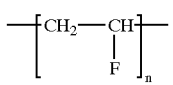 (15)
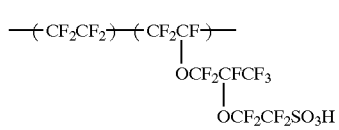 (16)
(17)
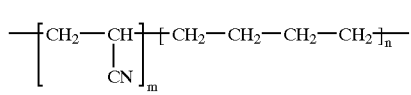 (18)
where in each of the formulas (1) to (18) n and m stand for numerical values large enough to provide a molecular weight of from 1000 to 500,000.
* * * * *